United States Patent Office 3,598,614
Patented Aug. 10, 1971

3,598,614
THICKENED EDIBLE SOY SAUCE AND METHOD
FOR THE PREPARATION THEREOF
Edward J. Hsu, 2065-D Orchard St.,
Urbana, Ill. 61801
No Drawing. Filed May 29, 1968, Ser. No. 732,825
Int. Cl. A23l 1/22
U.S. Cl. 99—145                                                 7 Claims

ABSTRACT OF THE DISCLOSURE

A novel thickened soy sauce is prepared by heating liquid soy sauce, adjusted in pH to about 4.5–5, with mixed gelatin and agar or with mixed glutinous rice starch and tapioca starch, the preparation with starches also involving a sequence of controlled cooling steps. The thickened sauce so prepared is highly stable and is adapted to be spread over or otherwise applied to food stuffs.

BACKGROUND OF THE INVENTION

Soy sauce is presently available only as a sauce having a liquidity which is essentially that of water itself. It is frequently servied in a dish into which bits of food are dipped in order to imbue them with the taste of the sauce and to bring out the flavor of the food, it being noted that soy sauce is a natural source of amino acids. This method is not only extremely wasteful, but with 80 percent or more of the poured sauce being unconsumed and normally discarded, but it is also unsatisfactory from a taste standpoint since the adherences of the liquid sauce to many of the foods dipped therein is poor. It should also be noted that soy ssauce poured from a bottle over food portions on a serving dish is fugitive and does not remain in place on the food. Instead, it pools up on the surface of the dish below the food.

The present invention obviates these deficiences.

SUMMARY OF THE INVENTION

This invention relates to a new and useful food product comprising a highly stable, thickened soy sauce composition which adheres to food stuffs and can readily be spread thereon or admixed therewith either at the table or in the kitchen. It can be prepared by first adjusting the pH of the conventional soy sauce product to approximately 4.5 to 5 and then heating the product for a short period of time with a small percentage of either a mixture of gelatin and agar or a mixture of starches one of which consists of amylopectin and the other of amylose and amylopectin, as represented, for example, by a mixture of glutinous rice starch and tapioca starch. In the case of starches, where gelatin may also be present, the heating step is followed by a controlled cooling step which is continued until the setting of the soy sauce composition is compete.

In either method of preparation, the product obtained, after decanting off any liquid supernatant layer which may be formed, is a thickened sauce which can readily be handled as a condiment and applied to foodstuffs in an even fashion without waste. The sauce readily adheres to the food surfaces and thus brings out the food flavor in maximum degree. Its consistency is such that it can easily be spooned from a container in the fashion of mayonnaise, or be shaken from a bottle in the fashion of catsup.

DETAILED DESCRIPTION OF THE INVENTION

In preparing the thickened soy sauce composition of this invention, there is employed a novel method which comprises first adjusting the pH of the soy sauce, as by addition of caustic (NaOH) or the like, to a condition of mild acidity, a pH range of 4.5 to 5 being preferred. The sauce is then heated with a thickening agent made up of either a mixed starch (or mixed starch plus gelatin) or a mixture of agar and gelatin. It is also possible to employ as the thickening agent a mixture of starches together with agar or with both agar and gelatin, though this method is less preferred. In the case of the mixed starch addition product, the hot soy sauce composition is rapidly cooled to room temperatures and then kept at cold temperatures (e.g., 10° C.) to complete the primary setting of the thickened soy sauce. With the method employing mixed agar and gelatin, the hot mixture is merely cooled to room temperature as setting takes place.

In the method wherein the thickening is effected by the use of mixed starches, optionally along with gelatin, one component of the mixture, which constitutes from about 25 to 50 percent by weight thereof, is made up of a starch which contains largely (nearly 100%) amylopectin. Glutinous (waxy) rice starch or waxy corn (maize) starch are representative materials of this character, the former being preferred for use herein. The other component of the mixture is made up of starch which contains both amylopectin and amylose, representative starches of this character being tapioca, corn, potato and (common) rice starches. Of these starches, tapioca starch or a mixture of tapioca and corn starches are preferred for use in the present invention. A preferred starch-based thickening agent is one containing 25 to 50 percent glutinous rice starch, 75 to 50 percent tapioca starch and 0.1 to 0.4 percent gelatin. A somewhat less preferred composition is that wherein the tapioca starch is substituted in some measure by corn starch, the glutinous rice starch still making up at least 25 percent of the mixture.

Tapioca starch is usually sold as such, though it is also sold under the name of tapioca "flour." The glutinous rice starch is sold as such or as "waxy" or "sweet" rice "flour."

In carrying out the thickening process with a starch mixture as defined above, a soy sauce properly adjusted to a pH of about 4.5 to 5 is blended with from about 3 to 15 percent of the starch mixture and about 0.1 to 0.5 percent of gelatin, if the latter be employed. Preferred ranges are 5 to 12 percent starch and 0.2 to 0.4 percent gelatin. These percentages are in terms of the weight of the blended soy sauce composition. This mixture is then heated for several minutes at temperatures near the boiling point of water, e.g., 85° to 98° C., a typical operation being one wherein the sauce is heated at 95° C. for 10 minutes. This heating is preferably conducted in a closed, jacketed kettle. The paste thus formed is then rapidly cooled to room temperatures of about 25° to 30° C., following which it is maintained at temperatures substantially below room temperatures, e.g., about 8 to 12° C. until the primary setting of the thickened soy sauce is complete. This usually takes at least several hours, and periods of approximately 20 to 30 hours are usually employed. The product, is first cooled in bulk to room temperatures, is frequently placed into containers for this cold setting treatment. Any clear supernatant liquid formed on the top of the composition can be syphoned off or otherwise removed. The product is then ready for use.

In the method wherein the thickening agent comprises gelatin and agar, each material is used in an amount of from 0.1 to 0.5 percent in terms of the overall weight of the soy sauce composition, and preferably each is used in an amount of from about 0.2 to 0.4 percent by weight. Gelatin and agar are both readily available in the marketplace in powdered form.

In the preferred practice of the invention, the gelatin and agar mixture added to the liquid soy sauce is first liquified. This can be accomplished by dissolving the materials in a small amount of water, which is then heated at 120° C. in a suitable pressure vessel for a period of approximately 15 minutes. The solution is then brought down to a temperature of about 95°–100° C. and mixed for a short period at this temperature. It is then cooled immediately to 60°–75° C. and mixed well with the liquid soy sauce which is also at this temperature.

It should be pointed out that the agar and gelatin thickening agent cannot be mixed with the liquid soy sauce and then heated to sterilization temperatures since the agar gel is hydrolyzed under these conditions at a pH lower 6.0.

The following examples are illustrative of this invention and are not to be construed as limiting.

Example 1

The following ingredients are mixed in the proportions indicated on a weight basis:

| | Percent |
|---|---|
| Liquid soy sauce (adjusted to pH 4.5–5 by addition of NaOH) | 89.7 |
| Glutinous rice starch | 4.0 |
| Tapioca starch | 6.0 |
| Gelatin powder | 0.3 |

The mixture is cooked in a closed, jacketed kettle for 10 minutes at 95° C. The temperature of the mixture is then rapidly reduced to 30° C. as the kettle is placed in cold water and the contents are stirred to bring about rapid heat exchange. The mixture is then poured into containers for storage at 10° C. About 24 hours at this temperature are sufficient to complete the primary setting of the paste. Any clear supernatant liquid formed on the top is syphoned off, leaving a product having a viscosity of 400–800 cps. (Brookfield Model RVT) and the desired spreadability and food-adhering characteristics. It does not experience retragradation or otherwise deteriorate even when stored for long periods of time at room temperatures in a closed vessel.

Example 2

The procedure of Example 1 is repeated except that 6% of corn starch is used along with 4% rice starch, and 0.3% gelatin powder. The thickened soy sauce product so obtained has a soft and long texture, i.e., it tends to stretch and stick to the surface of food rather than to part easily in the fashion of the Example 1 product.

Example 3

The procedure of Example 1 is again repeated except that here the mixture contains 1.5% of glutinous rice starch and 3.0% of tapioca starch. The product is moderately less viscous than that obtained in the Example 1 preparation.

Example 4

0.3 part by weight each of agar and gelatin are dissolved in 10 parts by weight of water. The solution is heated to 120° C. for 15 minutes, following which it is swirled at 99°–100° C. and then cooled immediately to 60°–75° C. It is then mixed well with 89.4 parts by weight of liquid soy sauce (pH 4.5–5) previously heated to the same temperature. After mixing is complete, the composition is allowed to cool to room temperature, thus providing a stabilized thickened soy sauce which is well adapted to be employed on foods as a paste-like sauce.

I claim:

1. In a thickened edible liquid soy sauce composition, adjusted in pH to about 4.5 to 5, the improvement wherein the composition contains from about 3 to 15% by weight of a starch mixture made up from about 25 to 50% glutinous rice starch and about 75 to 50% tapioca starch.

2. The composition as in claim 1 wherein the sauce also contains from about 0.1 to 0.5% gelatin.

3. The thickened edible liquid soy sauce composition adjusted in pH to about 4.5 to 5, the improvement wherein the composition contains from about 0.2 to 0.4% by weight of gelatin together with from about 5 to 12% by weight of a starch mixture made up of about 25 to 50% of glutinous rice starch and about 75 to 50% tapioca starch.

4. The thickened edible liquid soy sauce composition adjusted in pH to about 4.5 to 5, the improvement wherein the composition thickened with from about 0.1 to 0.5% by weight of agar and from about 0.1 to 0.5% by weight of gelatin.

5. The thickened edible liquid soy sauce composition adjusted in pH to about 4.5 to 5, the improvement wherein the composition is thickened with from about 0.2 to 0.4% by weight of gelatin.

6. The method of preparing an edible thickened soy sauce the steps of adjusting the pH of a liquid soy sauce to a level of about 4.5 to 5, combining therewith 0.1 to 0.5% by weight of gelatin and a mixture of glutinous rice starch and tapioca starch in total amount of from 3 to 15% by weight of the composition, said rice starch constituting from 25 to 50% of the starch mixture, heating the resulting mixture at from about 85° to 98° C. for several minutes and then cooling the same at temperatures substantially below room temperature until setting of the composition is complete.

7. The method of preparing an edible thickened soy sauce the steps of adjusting the pH of a liquid soy sauce to a level of about 4.5 to 5, combining therewith a solution of agar and gelatin, said agar and gelatin each being present in the composition in the amount of from 0.1 to 0.4 percent by weight, mixing the resulting composition at a temperature from about 60° to 75° C., and cooling the same until the setting of the composition is complete.

References Cited

Binsted, Devey, and Daken Pickle and Sauce Making, Food Trade Press, London, 1962, pp. 96 and 120.

Given, Modern Encyclopedia of Cooking, J. G. Ferguson and Assoc., Chicago, 1949, vol. 2, p. 884.

A. LOUIS MONACELL, Primary Examiner

W. A. SIMONS, Assistant Examiner